Figure 1:
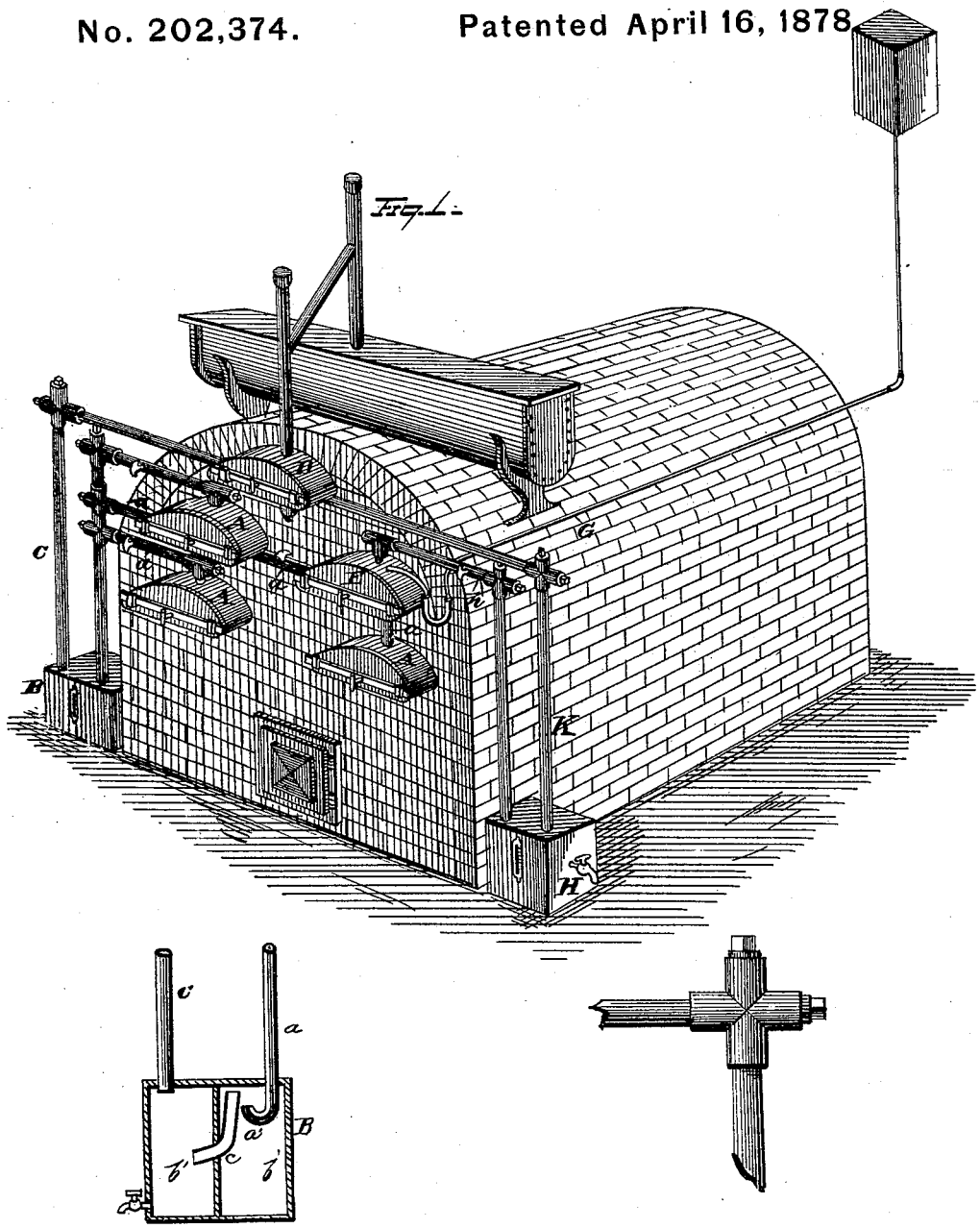

3 Sheets—Sheet 2

G. RAMSDELL.
Process and Apparatus for Manufacturing Illuminating Gas.

No. 202,374. Patented April 16, 1878.

WITNESSES
Geo. J. Nottingham
A. W. Bright.

INVENTOR
George Ramsdell,
By Leggett & Leggett
ATTORNEYS.

3 Sheets—Sheet 3
G. RAMSDELL.
Process and Apparatus for Manufacturing Illuminating Gas.
No. 202,374. Patented April 16, 1878.
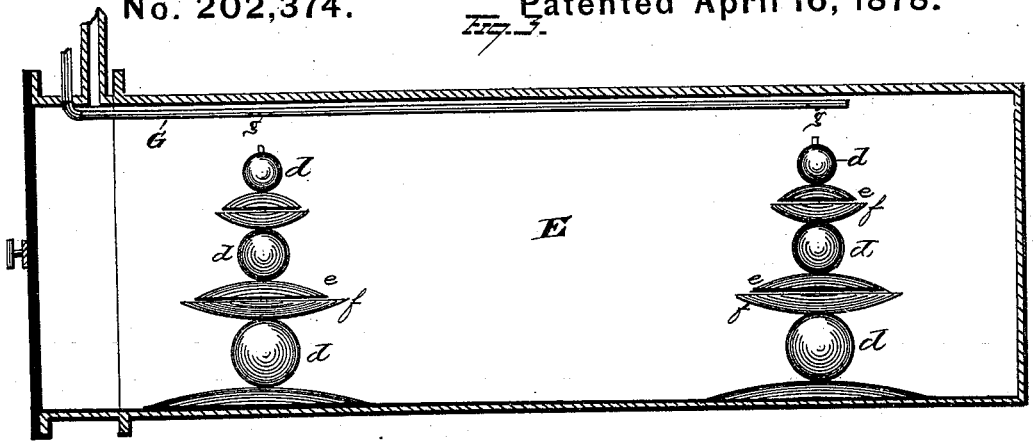
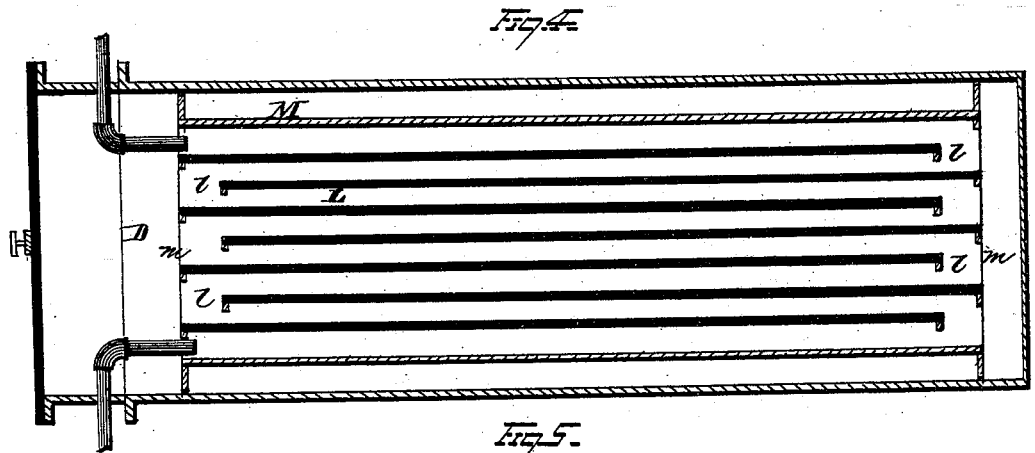
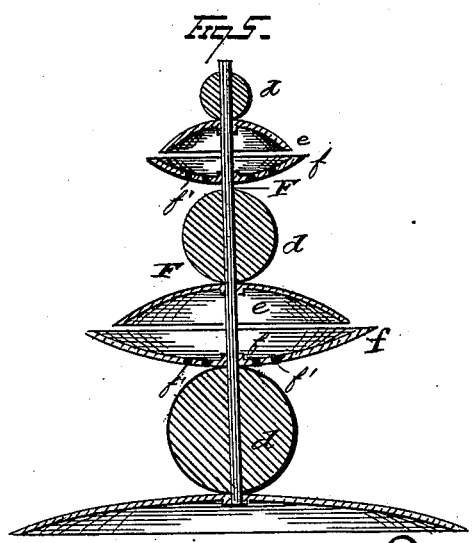
WITNESSES
Ed. S. Nottingham
A. W. Bright.
INVENTOR
George Ramsdell,
By Leggett and Leggett.
ATTORNEYS

UNITED STATES PATENT OFFICE.

GEORGE RAMSDELL, OF DETROIT, MICHIGAN.

IMPROVEMENT IN PROCESSES AND APPARATUS FOR MANUFACTURING ILLUMINATING-GAS.

Specification forming part of Letters Patent No. 202,374, dated April 16, 1878; application filed March 11, 1878.

*To all whom it may concern:*

Be it known that I, GEORGE RAMSDELL, of Detroit, in the county of Wayne and State of Michigan, have invented certain new and useful Improvements in Process and Apparatus for Manufacturing Illuminating-Gas; and I do hereby declare the following to be a full, clear, and exact description of the invention, such as will enable others skilled in the art to which it pertains to make and use it, reference being had to the accompanying drawings, which form part of this specification.

My invention consists, first, in a process of manufacturing illuminating-gas, which is as follows: The gas, which is generated from the destructive distillation of wood, is conducted into a double-compartment chamber, where the pyroligneous acid is separated from it and deposited in the first one of said compartments, while the gas, thus freed from such impurity, is passed through a body of water in the second compartment, and thereby washed. The wood-gas is then carried into an independent retort, where it is reheated, together with hydrocarbon vapor, the latter having been washed by passage through a body of water in its course between the vapor-generating retort and this independent reheating-retort, in which it meets and mixes with the wood-gas. The wood-gas, thus freed from its pyroligneous acid and then washed in water, is in this manner reheated in connection with the hydrocarbon vapor, which latter has been previously passed through a body of water, so that the said gas and vapor are together subjected to a reheating treatment, and the united gas thus produced is passed off to the hydraulic main.

The invention further consists in apparatus used in carrying out the above-described process of manufacture, which will appear from the description in the body of the specification, and the claims relating to the same.

The invention further consists in a peculiar construction of the hydrocarbon-retort, as follows: A series of removable standards are located within the retort to receive and vaporize the oil, each of them made as follows: A series of balls or spherical surfaces is arranged upon a vertical support, alternately between systems of upper convex and lower concave plates, and adapted to cause the oil to pass from off each of the balls in vertical order onto the convex plate, and off the edge thereof onto the concave plate. The latter plate, being perforated, permits the oil to thence pass onto the next lower ball, and so on downward until it is volatilized and passed off in vapor.

Figure 2:
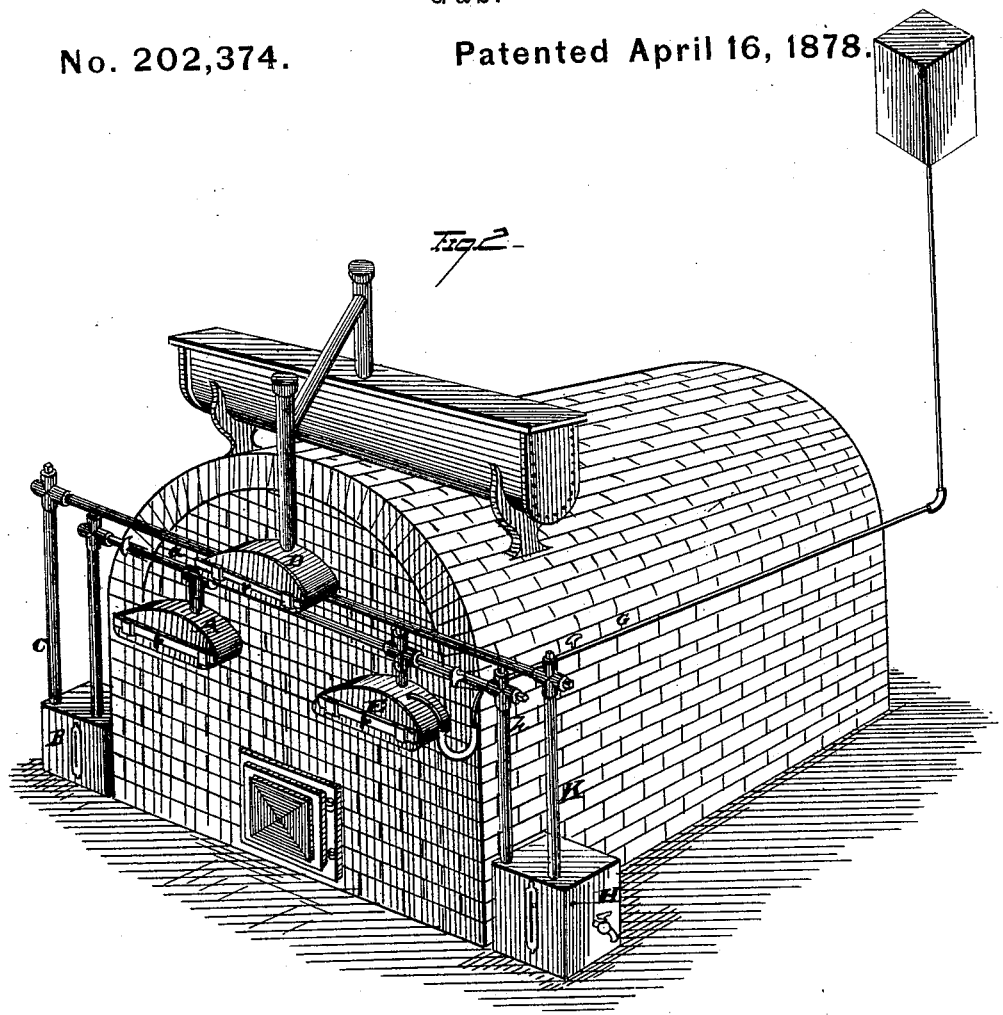

Referring to the drawings, Figure 1 is a view, in perspective, of my improved apparatus, with certain parts in detail. Fig. 2 is a similar view of an apparatus having a bench of three retorts. Fig. 3 is a view, in sectional detail, of the oil-retort. Fig. 4 is a sectional view of the reheating-retort in detail. Fig. 5 represents a single view of one of the removable vaporizing-standards with which the oil-retort is provided.

The apparatus may be made having benches of any desired number of retorts, and, preferably, I make either a five-bench retort, as shown in Fig. 1, or a three-bench retort, as shown in Fig. 2, the latter being well adapted for use in single blocks of buildings, hotels, and in similar other uses.

The wood-retorts A are made in any suitable manner, with the usual appurtenances, as shown in the drawings. From each of them a pipe, $a$, extends, so as to connect with the receiving-vessel B, which latter is made in two compartments, $b$ $b'$. The one compartment, $b$, into which the gas, as distilled from the wood-retorts, is conducted, serves as a receptacle for the pyroligneous acid which discharges from the upturned extremity $a'$ of the gas-conduit $a$, while the remaining compartment, $b'$, serves the usual purpose of a gas-washing chamber, receiving the gas through pipe $c$, which connects the two compartments, and allowing it to pass out, after being washed, into the pipe C, and through the latter into the reheating-retort D.

The five-bench retort (shown in Fig. 1) has three wood-retorts secured therein, while the three-bench retort (shown in Fig. 2) has but the one wood-retort.

The oil-retort E in both instances is the same, and made as shown in Fig. 3. A series of standards, F, are placed within the retort, loosely resting upon its bottom, and adapted to receive upon its vaporizing-surface the oil as the latter is discharged thereon from above. These standards are provided with two or more balls or spherical surfaces. $d$, having a convex plate, $e$, and a concave plate, $f$, placed between each of the same, the lower concave plate $f$ being larger than the upper convex plate $e$, and provided with perforations $f'$. The oil is discharged upon these standards from the pipe G, having openings $g$ at suitable intervals, so as to allow the oil to strike the top ball on each of the several standards, placed, respectively, in vertical line beneath the said openings $g$. The oil flows over the spherical surface of said top ball, and is thereby exposed to a large heating-surface, from which it drips down onto the upper convex plate $e$, which also provides a large heating-surface; and from thence it passes over the edge of said plate down onto the concave plate $f$.

The direction of the oil is just reversed upon this latter plate from that which takes place upon the convex plate above, so that the oil is caused to flow back and forth horizontally in passing over the said plates. The perforations $f'$ permit the oil to next pass onto the ball below this concave plate, and the operation is repeated as the oil descends down over the standard. This combination of spherical surfaces with the system of convex and concave plates, arranged intermediately between each of them, provides most excellent vaporizing-surfaces, and the oil is thoroughly volatilized before reaching the bottom of the retort. Since these vaporizing-standards are made free and independent of the retort in which they are placed, they may be readily removed, and thus be easily cleaned. The impurities which collect upon the vaporizing-surface in an oil-retort can in this way be freed therefrom, and the standards be replaced in position within the retort. The hydrocarbon vapor thus generated is passed through connecting-pipe $h$ into the chamber H, and subjected therein to the usual process of purifying by washing in water. When purified, the gas is conducted by pipe K into the reheating-retort, where it meets and unites with the wood-gas, which latter is conducted therein, as before described. This reheating-retort D is provided with a removable system of shelves or plates, L, having alternate end passages $l$ leading from one to the other. These shelves rest upon cleats or other suitable supports, secured to the front and rear end pieces $m$ of the frame or box M. This shelf-supporting frame is made independent of the retort proper, and is adapted to be removed therefrom, and the several shelves disconnected or taken out. In this way the reheating-retort may be readily provided with a greater or less number of these shelves or plates, which act as heating-surfaces. The heating area of the retort is made variable, so that for certain purposes the gas may be subjected to a greater or to a less reheating treatment, as may be desired. This construction also provides for the easy cleaning of the shelves, as they may become in any wise dirty or affected by use, since they may be readily taken out and thoroughly washed.

The retort D is provided with suitable inlet and outlet pipes, connecting, respectively, with its bottom and top, so that the gas takes its circuitous course horizontally from end to end of the retort, passing up through the vertical passages at alternate ends thereof, and passes out to the usual hydraulic main.

By the above process of manufacture the gas from the wood or other vegetable substance in its respective retort or retorts is passed, together with the pyroligneous acid, as products of the destructive distillation, into a chamber, where the said acid is deposited, and the gas is carried on alone into a purifying chamber or compartment to be washed. The gas, thus first relieved from the pyroligneous acid, and then washed, is conducted into a retort to be reheated, in union with a washed hydrocarbon vapor. The said gas and vapor, thus commingled and subjected to this reheating treatment, are then passed out into the hydraulic main as gas of a high degree of illuminating power.

In the foregoing description I have spoken of wood as in contradistinction from the oil by way of brevity; but I desire to be understood as including within the meaning of the term other similar substances. Thus, instead of wood, I may use peat or other suitable vegetable substance; and, instead of oil, any suitable hydrocarbon may be substituted.

The several balls and intermediate systems of convex and concave plates are independently formed upon their respective vaporizing-standards, so that each of the said balls and plates may be readily removed from the supporting-upright and cleaned thoroughly of all impurities.

The several pipes which pass the gas from one to another of the different parts of the apparatus are made with joint-connections having removable plugs, as shown in the right-hand detail view of Fig. 1. By means of such construction the pipes may be readily cleaned by removing the plugs, swabbing out the pipes, and then replacing said plugs, as formerly. The pipes are also provided with stop-cocks at suitable points thereon, as shown.

It will be observed that by the foregoing-described process the hydrocarbon vapor is washed by passage through a body of water prior to its introduction into the reheating-retort. This cleanses the same from any impurities which may attend it, and removes all matter which is objectionable in manufacturing good illuminating-gas. This feature of washing the hydrocarbon vapor, in connection with the other steps of the process, is productive of a brilliant gas, and distinguishes my invention from the old process of producing illuminating-gas by distilling gas from wood, purifying and subjecting it to a reheating and fixing operation in a separate retort with the vapor of hydrocarbon-oil.

Having fully described my invention, what I claim as new, and desire to secure by Letters Patent, is—

1. The process for the manufacture of illuminating-gas, substantially as herein described, which consists of the following steps: first, distilling gas from wood and separating the pyroligneous acid therefrom; then washing the said gas by passage through a body of water; and, finally, subjecting the same to a reheating treatment in connection and together with hydrocarbon vapor, which latter has been previously washed in water, substantially as set forth.

2. In apparatus for the manufacture of gas, the combination, with a hydrocarbon-retort, of one or more removable vaporizing-standards, the latter being respectively made with the described system of balls and plates arranged in vertical alternate series upon the supporting-upright, substantially as set forth.

3. In apparatus for the manufacture of gas, the combination, with one or more wood-retorts, A, and suitable connections, of the double-compartment chamber B, in which the pyroligneous acid is separated from the gas and the latter passed through the water, together with the reheating-retort D and the connection therewith, substantially as set forth.

4. In apparatus for the manufacture of gas, a hydrocarbon-retort provided with one or more removable vaporizing-standards made with an alternate series of balls and a system of convex and concave plates, said concave plates being perforated, substantially as set forth.

5. In a hydrocarbon-retort, a vaporizing-standard made with the series of balls arranged intermediately between a system of vaporizing-plates, the upper one of which is convex and smaller than its corresponding lower concave plate, which latter is perforated, said balls and plates being independent of each other and removable from the supporting-upright, substantially as set forth.

In testimony that I claim the foregoing I have hereunto set my hand this 11th day of March, 1878.

GEORGE RAMSDELL.

Witnesses:
F. J. McCLEARY,
FRANK GALT.